(12) United States Patent
Nagarajan et al.

(10) Patent No.: US 12,014,081 B2
(45) Date of Patent: Jun. 18, 2024

(54) HOST MANAGED BUFFER TO STORE A LOGICAL-TO PHYSICAL ADDRESS TABLE FOR A SOLID STATE DRIVE

(71) Applicant: Intel Corporation, Santa Clara, CA (US)

(72) Inventors: Suresh Nagarajan, Folsom, CA (US); Anoop Mukker, Folsom, CA (US); Shankar Natarajan, Folsom, CA (US); Romesh Trivedi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 584 days.

(21) Appl. No.: 17/122,158

(22) Filed: Dec. 15, 2020

(65) Prior Publication Data

US 2021/0096778 A1    Apr. 1, 2021

(51) Int. Cl.
    *G06F 3/06*       (2006.01)
(52) U.S. Cl.
    CPC .......... *G06F 3/0659* (2013.01); *G06F 3/0604* (2013.01); *G06F 3/0679* (2013.01)
(58) Field of Classification Search
    None
    See application file for complete search history.

(56) References Cited

U.S. PATENT DOCUMENTS

| | | | |
|---|---|---|---|
| 10,296,224 B2 | 5/2019 | Li et al. | |
| 10,466,917 B2 | 11/2019 | Loewen et al. | |
| 10,482,010 B2 | 11/2019 | Boyd et al. | |
| 10,528,463 B2 | 1/2020 | Li et al. | |
| 11,714,748 B1 | 8/2023 | Harris et al. | |
| 2007/0300037 A1 | 12/2007 | Rogers et al. | |
| 2014/0181375 A1 | 6/2014 | Miyamoto et al. | |
| 2014/0195725 A1* | 7/2014 | Bennett | G06F 12/0246 711/103 |
| 2017/0139642 A1 | 5/2017 | Tan | |
| 2019/0042460 A1 | 2/2019 | Trika et al. | |
| 2019/0272236 A1 | 9/2019 | Li et al. | |
| 2019/0354482 A1 | 11/2019 | Lee | |
| 2020/0272577 A1 | 8/2020 | Zeng et al. | |
| 2021/0081141 A1* | 3/2021 | Curewitz | G06F 3/0659 |
| 2023/0281123 A1 | 9/2023 | Harris et al. | |

FOREIGN PATENT DOCUMENTS

| | | |
|---|---|---|
| EP | 3696680 B1 | 3/2022 |
| GB | 2598784 A | 11/2022 |

OTHER PUBLICATIONS

Extended European Search Report for Patent Application No. 21198685.6, dated Apr. 5, 2022, 6 pages.
Notice of Allowance for U.S. Appl. No. 17/122,152, Mailed Feb. 9, 2024, 8 pages.

\* cited by examiner

*Primary Examiner* — Tan T. Nguyen
(74) *Attorney, Agent, or Firm* — Compass IP Law PC

(57) ABSTRACT

Dirty Logical-to-Physical (L2P) entries in an L2P indirection table stored in a host volatile memory buffer are flushed to non-volatile memory in the solid state drive through the use of a write-back mode based on flush checkpoints. The use of write-back mode to flush dirty entries in the L2P indirection table to non-volatile memory in the solid state drive based on flush checkpoints results in an increase in the write bandwidth of the solid state drive.

20 Claims, 7 Drawing Sheets

| LBA | L2P | |
|---|---|---|
| 0 | PLOC-A | META-A |
| 1 | PLOC-C | META-C |
| 2 | PLOC-B | META-B |
| 3 | PLOC-Z | META-Z |
| 4 | PLOC-X | META-X |
| 5 | PLOC-Y | META-Y |
| ... | ... | ... |
| ... | ... | ... |
| MAXLBA | PLOC-ZZ | META-ZZ |

FIG. 2

HOST MANAGED BUFFER TO STORE A LOGICAL-TO PHYSICAL ADDRESS TABLE FOR A SOLID STATE DRIVE

FIELD

This disclosure relates to storage devices and in particular to a Logical to Physical (L2P) address table for a solid state drive stored external to the solid state drive in a host managed buffer.

BACKGROUND

A computer system typically includes a volatile system memory and a storage device. The volatile system memory may be Dynamic Random Access Memory (DRAM). The storage device may be a Solid State Drive (SSD) that includes block addressable non-volatile memory.

A logical block is the smallest addressable data unit for read and write commands to access the block addressable non-volatile memory in the Solid State Drive (SSD). The address of the logical block is commonly referred to as a Logical Block Address (LBA).

A logical-to-physical (L2P) address table stores a physical block address in block addressable non-volatile memory in the SSD corresponding to each LBA. The size of the L2P address table is dependent on the user-capacity of the SSD. Typically, the size of the L2P address table is about one Mega Byte (MB) per Giga Byte (GB) of the user-capacity (the non-volatile memory available to users of the SSD) in the SSD.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 2 is an example of the Solid State Drive L2P Indirection Table shown in FIG. 1 that may be stored in the block addressable non-volatile memory shown in FIG. 1;

Figure 1:
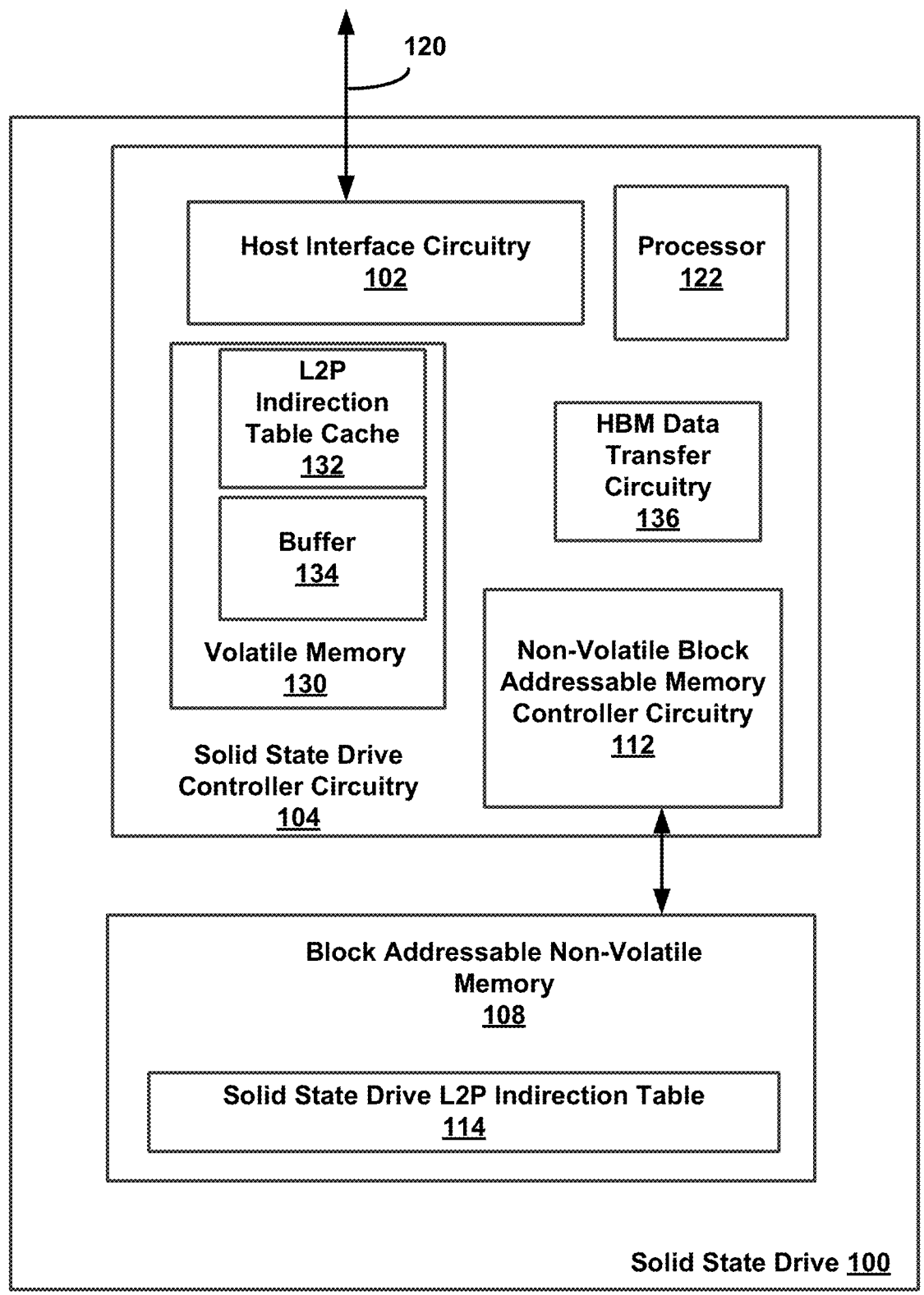
FIG. 1 is a block diagram of an embodiment of a solid state drive.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A Logical-to-Physical (L2P) indirection table (also referred to as an L2P address table or L2P table) is stored in a byte-addressable volatile memory for example, Dynamic Random Access Memory (DRAM) or Synchronous Dynamic Random Access memory (SDRAM). The L2P indirection table is stored in byte-addressable volatile memory to speed up the reading of the physical block address from the L2P indirection table to access the physical block in block addressable non-volatile memory, for example, NAND flash memory in a solid state drive. The byte-addressable volatile memory to store the L2P indirection table can be included in the solid state drive or in a host system that is communicatively coupled to the solid state drive.

The L2P indirection table can be stored in a host memory buffer in the host system. The host memory buffer may be a portion of the volatile memory. On every update (write) to the L2P indirection table (host L2P indirection table) that is stored in the host memory buffer, the L2P indirection table (SSD L2P indirection table) that is stored in the block addressable non-volatile memory in the solid state drive is also written. The concurrent write to both L2P indirection tables (host L2P indirection table and SSD L2P indirection table) is referred to as write-through mode. The performance of the concurrent write to the L2P indirection tables is based on the longest write time, that is, the time to write to the block addressable non-volatile memory in the solid state drive or to the host memory buffer. Write-through mode results in a decrease in the solid state drive write bandwidth when the L2P indirection table stored in the host memory buffer is frequently written to the block-addressable non-volatile memory in the solid state drive.

The L2P indirection table can be stored in a byte-addressable volatile memory in the solid state drive. However, the size of the L2P table is dependent on the user-capacity of the solid state drive, for example, about one Mega Byte (MB) per Giga Byte (GB) of user-capacity in the solid state drive. An increase in the non-volatile memory (also referred to as user-capacity) in the solid state drive requires a corresponding increase in the byte-addressable volatile memory in the solid state drive to store the L2P indirection table.

In an embodiment, instead of storing the L2P indirection table in a volatile memory (for example, Dynamic Random Access Memory (DRAM) in the solid state drive, a portion of the L2P indirection table is stored in a host volatile memory buffer. Dirty L2P entries in the L2P indirection table stored in the host volatile memory buffer are flushed based on flush checkpoints to non-volatile memory in the solid state drive through the use of a write-back mode. The use of write-back mode to flush a dirty entry in the L2P indirection table to non-volatile memory in the solid state drive based on flush checkpoints results in an increase in the write bandwidth of the solid state drive.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of an embodiment of a solid state drive 100. The solid state drive 100 includes solid state drive controller circuitry 104 and a block addressable non-volatile memory 108.

The solid state drive controller circuitry 104 includes host interface circuitry 102, non-volatile block addressable memory controller circuitry 112, a processor 122, Host Memory Buffer data transfer circuitry 136 and a static random access memory 130. The solid state drive controller circuitry 104 can be included in a Field Programmable Gate Array (FPGA) or an Application Specific Integrated Circuit (ASIC).

A host system can communicate with the solid state drive 100 over a high-speed serial computer expansion bus 120, for example, a Peripheral Component Interconnect Express (PCIe) bus. The host interface circuitry 102 manages the communication over the Peripheral Component Interconnect Express (PCIe) bus. In an embodiment, the host system communicates over the Peripheral Component Interconnect Express (PCIe) bus using a Non-Volatile Memory Express (NVMe) standard protocol. The Non-Volatile Memory Express (NVMe) standard protocol defines a register level interface for host software to communicate with the Solid State Drive (SSD) 100 over the Peripheral Component Interconnect Express (PCIe) bus. The NVM Express standards are available at www.nvmexpress.org. The PCIe standards are available at pcisig.com.

The block addressable non-volatile memory 108 is a non-volatile memory. A non-volatile memory (NVM) device is a memory whose state is determinate even if power is interrupted to the device. In one embodiment, the block addressable non-volatile memory 108 is a NAND Flash memory, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell ("PLC") or some other NAND Flash memory).

The block addressable non-volatile memory 108 includes at least one non-volatile memory die, for example a NAND Flash die. Typically, data is written (striped) across many NAND Flash die in the SSD to optimize the write bandwidth. The non-volatile memory on the non-volatile memory die includes a plurality of blocks, with each block including a plurality of pages. Each page in the plurality of pages to store data and associated metadata. In an embodiment, the non-volatile memory die has 2048 blocks, each block has 64 pages, and each page can store 2048 bytes of data and 64 bytes of metadata.

The static random access memory 130 is a volatile memory. Static Random Access memory (SRAM) is a volatile memory. Volatile memory is memory whose state (and therefore the data stored in it) is indeterminate if power is interrupted to the device. SRAM is a type of volatile memory that uses latching circuitry to store each bit. SRAM is typically used as a cache memory because in contrast to Dynamic Random Access Memory (DRAM) the data stored in SRAM does not need to be periodically refreshed.

A portion of the static random access memory 130 is allocated as a L2P indirection table cache 132 to store a portion of the solid state drive L2P Indirection table 114. Another portion of the static random access memory 130 is allocated as a buffer 134 to store data to be transferred over the high-speed serial computer expansion bus 120 between a host memory buffer in the host system and the block addressable non-volatile memory 108. The solid state drive 100 does not include a Dynamic Random Access Memory (DRAM) and may be referred to as a DRAMLess solid state drive.

Figure 2:
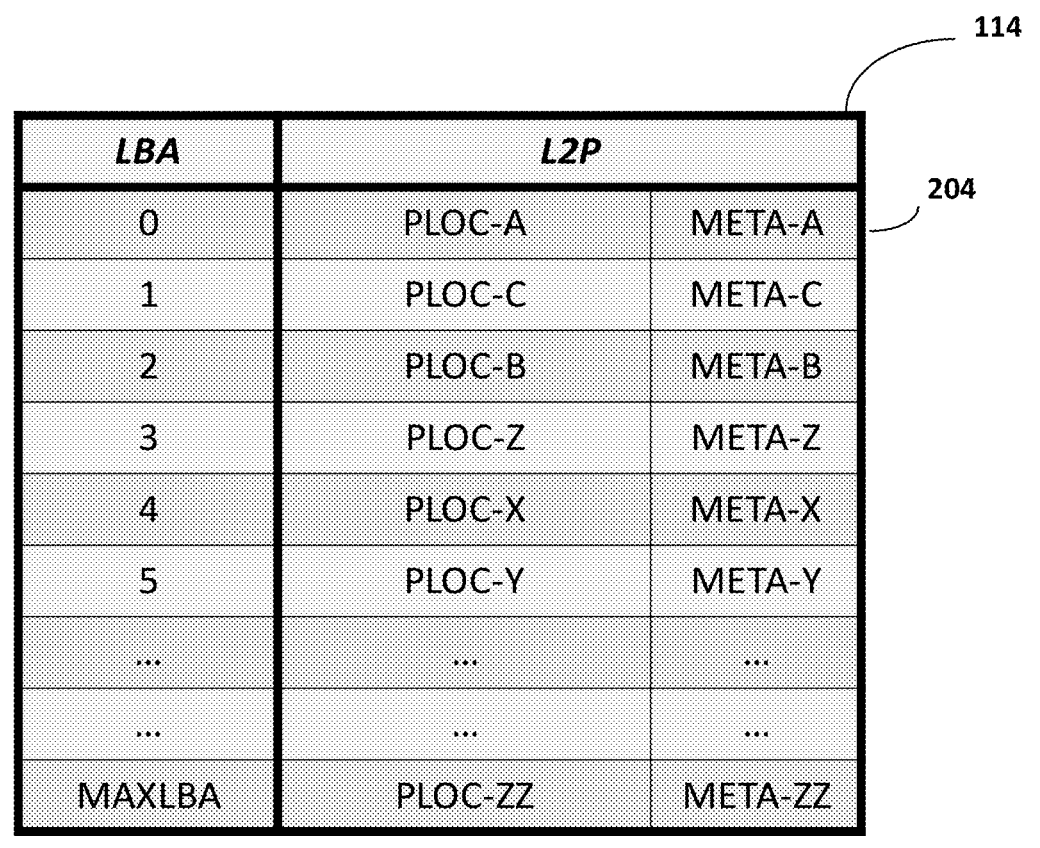

FIG. 2 is an example of the solid state drive L2P Indirection Table 114 shown in FIG. 1 that may be stored in the block addressable non-volatile memory 108 shown in FIG. 1. Each L2P entry ("row") 204 in the solid state drive L2P indirection table 114 stores a physical location ("PLOC") in the block addressable non-volatile memory 108 in the solid state drive 100. The physical location corresponds to the Logical Block Address (LBA) (table indices from index 0 to MAXLBA). The L2P entry 204 also includes metadata ("META").

In an embodiment in which the block addressable non-volatile memory 108 in the solid state drive 100 includes one or more NAND Flash dies, a PLOC is the physical location in the one or more NAND Flash dies where data is stored for a particular LBA. For example, in L2P entry 204, physical location A ("PLOC-A") corresponding to LBA 0 may be NAND Flash die-0, block-1, page-1, offset-0.

Figure 3:
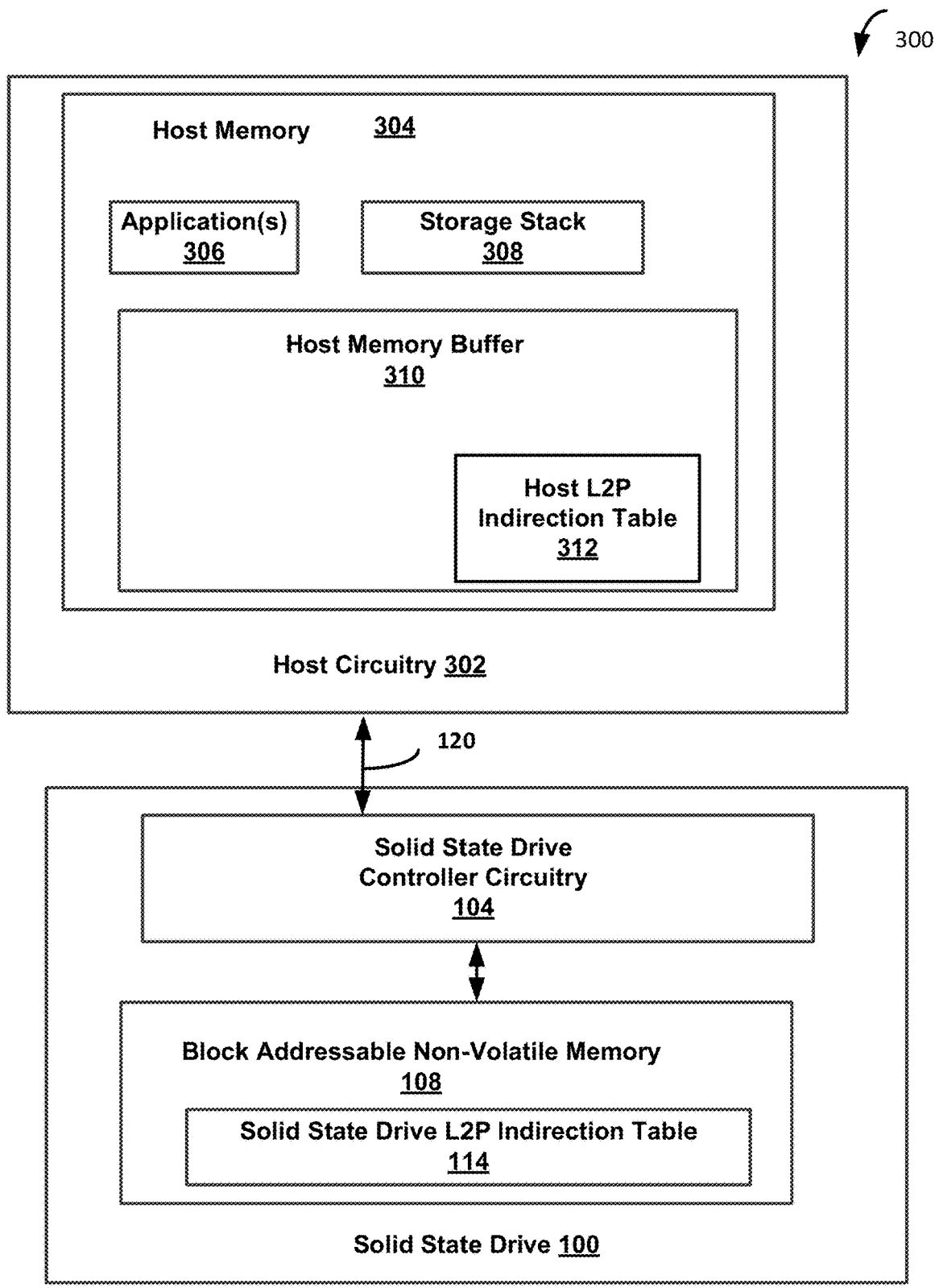
FIG. 3 is a block diagram of a computer system that includes host circuitry communicatively coupled to the solid state drive shown in FIG. 1.

FIG. 3 is a block diagram of a computer system 300 that includes host circuitry 302 communicatively coupled to the solid state drive 100 shown in FIG. 1. The host circuitry 302 includes a host memory buffer 310 to store a host L2P indirection table 312. Metadata is data that provides information about other data. For example, one bit of the metadata may be a "lock bit" to prevent read/write access to the PLOC in the L2P entry 204 in the L2P indirection table 114. Another bit of the metadata may be a "dirty bit", the state of which indicates whether user data for the entry 204 has been flushed from the host memory buffer 310 in host circuitry 302 to the block addressable non-volatile memory 108 in the solid state drive 100.

The host memory 304 is a volatile memory that is external to the solid state drive 100. Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

One or more applications 306 (programs that perform a particular task or set of tasks), a storage stack 308 and a host memory buffer 310 may be stored in host memory 304. The host memory buffer 310 can be a portion of host memory 304 that is assigned for exclusive use by the solid state drive controller circuitry 104.

A request to read data stored in block addressable non-volatile memory 108 in the solid state drive 100 may be issued by one or more applications 306 (programs that perform a particular task or set of tasks) through the storage stack 308 in an operating system to the SSD controller circuitry 104.

An operating system is software that manages computer hardware and software including memory allocation and access to Input/Output (I/O) devices. Examples of operating systems include Microsoft® Windows®, Linux®, iOS® and Android®. In an embodiment for the Microsoft® Windows® operating system, the storage stack 308 may be a device stack that includes a port/miniport driver for the solid state drive 100.

In an embodiment in which the solid state drive 100 is communicatively coupled to the host memory 304 using the NVMe over PCIe protocol, host software may provide a descriptor list that describes a set of address ranges in the host memory 304 for exclusive use by the solid state drive controller circuitry 104. The host L2P indirection table 312 is stored in the address ranges in a host memory buffer 310 in the host memory 304 that is allocated by the host system for the exclusive use of the solid state drive controller circuitry 104 in response to a request received by the host system from the solid state drive 100. The solid state drive 100 has exclusive use of host memory buffer 310 until it is released by the host system.

The solid state drive controller circuitry 104 in the solid state drive 100 queues and processes commands (for example, read, write ("program"), erase commands received from the host circuitry 302 to perform operations in the block addressable non-volatile memory 108. Commands received by the solid state drive controller circuitry 104 from the host circuitry 302 can be referred to as Host Input Output (10) commands.

As the Host IO commands are received, L2P entries 204 are written to the L2P indirection table cache 132 in the static random access memory 130. When all of the L2P entries 204 in the L2P indirection table cache 132 have been written (that is, all are used), the HBM data transfer circuitry 136 moves the L2P entries 204 to the Host L2P indirection table 312 over the high-speed serial computer expansion bus 120.

The host memory buffer 310 in the host memory 304 is operated in write-back cache mode for the solid state drive L2P Indirection Table 114 in the block addressable non-volatile memory 108 in the solid state drive 100. In write back cache mode, a write operation to the solid state drive L2P indirection table 114 is initially only written to the host L2P indirection table 312 and the dirty bit in the metadata in the entry in the host L2P indirection table 312 is marked as "dirty" for later writing to the solid state drive L2P Indirection Table 114 in the block addressable non-volatile memory 108 in the solid state drive 100.

During the first power up initialization of the computer system, the solid state drive 100 is initialized for the first time, there are no entries stored in the solid state drive L2P indirection table 114. The solid state drive controller circuitry 104 in the solid state drive 100 obtains exclusive use of an allocated portion of host memory buffer 310 in the computer system 300 to store the Host L2P indirection table 312. As data is written to the block addressable non-volatile memory 108 in the solid state drive 100, L2P entries are written to the L2P indirection table cache 132 in the static random access memory 130 in the solid state drive 100. When all the L2P entries in the L2P indirection table cache 132 are used, the L2P entries are written to the Host L2P indirection table 312 by the Host Memory Buffer transfer circuitry 136. L2P entries in the Host L2P indirection table 312 are written to Solid State Drive L2P indirection table based on status of a plurality of checkpoints that will be described later in conjunction with FIG. 6.

During subsequent power up initialization of the computer system 300, the solid state drive controller circuitry 104 in the solid state drive 100 obtains exclusive use of an allocated portion of host memory buffer 310 in the computer system 300 to store the Host L2P indirection table 312. The L2P entries stored in the Solid State Drive L2P indirection table 114 in the solid state drive 100 are written to the host L2P indirection table 312. The solid state drive controller circuitry 104 uses the Host L2P indirection table 312 as a write-back cache for the solid state drive L2P indirection table 114.

A read of an entry in the solid state drive L2P indirection table 114 in the Solid State drive 100 is initially directed to the L2P indirection table cache 132 in the static random access memory 130 in the solid state drive 100. If there is a "hit", that is, the dirty bit in the metadata in the L2P entry 204 in the L2P indirection table cache 132 indicates that the L2P entry 204 is "clean", the L2P entry 204 is read from the L2P indirection table cache 132. If there is a "miss", that is, the dirty bit in the metadata in the L2P entry 204 in the L2P indirection table cache 132 is "dirty", the L2P entry 204 is read from the Host L2P Indirection table 312 that is stored in the host memory buffer 310 if the L2P entry 204 in the Host L2P indirection table 312 is "clean".

L2P entries 204 in the host L2P indirection table 312 that are marked as "dirty" are "lazily flushed" ("lazily written") to the solid state drive L2P Indirection Table 114 in the block addressable non-volatile memory 108 in the solid state drive 100. In order to mitigate potential performance issues due to the writing of these "dirty" L2P entries 204 during runtime, writes of "dirty" L2P entries 204 (also referred to as a "flush") in the host L2P indirection table 312 entries are performed based on status of a plurality of checkpoints that will be described later in conjunction with FIG. 6.

Figure 4:
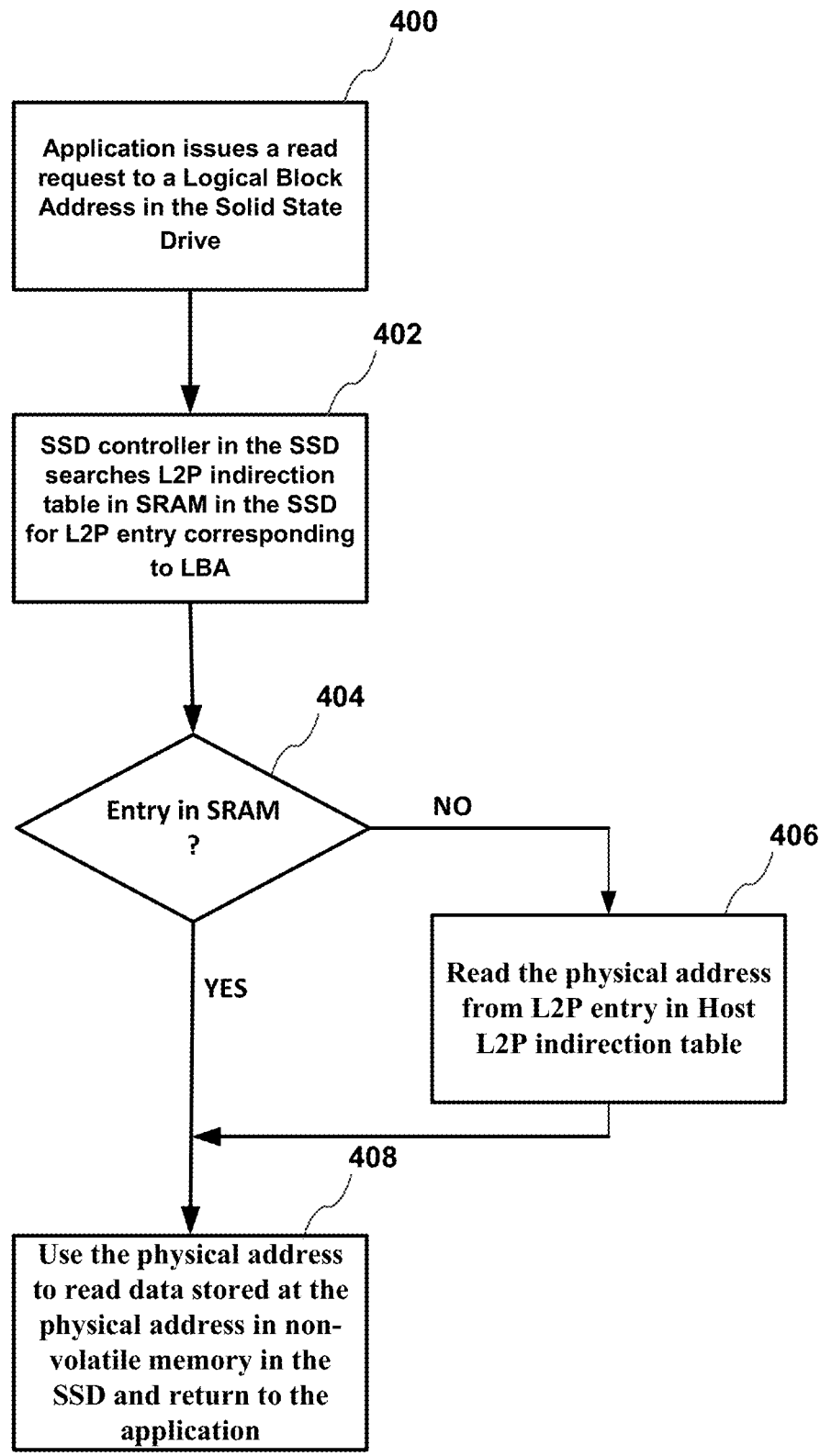
FIG. 4 is a flowgraph of a read operation performed in the solid state drive using the L2P indirection table in the computer system and the L2P indirection table cache in the solid state drive.

FIG. 4 is a flowgraph of a read operation performed in the solid state drive 100 using the host L2P indirection table 312 in the computer system 300 and the L2P indirection table cache 132 in the solid state drive 100.

Turning to FIG. 4, at block 400, a request to read data stored in block addressable non-volatile memory 108 in the solid state drive 100 can be issued by one or more applications 306 (programs that perform a particular task or set of tasks) through the storage stack 308 in the operating system to the solid state drive controller circuitry 104. Processing continues with block 402.

At block 402, the solid state drive controller circuitry 104 performs a search in the L2P indirection table cache 132 in the static random access memory 130 for an L2P entry corresponding to the logical block address provided in the read request. Processing continues with block 404.

At block 404, if an L2P entry corresponding to the logical block address is in the L2P indirection table cache 132 in the static random access memory 130, the solid state drive controller circuitry 104 reads the physical block address from the L2P entry and processing continues with block 406. If the entry corresponding to the logical block address is not in the L2P indirection table cache 132 in the static random access memory 130, that is, there is a "miss", processing continues with block 406.

At block 406, the SSD controller circuitry 104 reads the physical block address from the L2P entry corresponding to the logical block address provided in the read request from the Host L2P indirection table 312 that is stored in the host memory buffer 310. Processing continues with block 408.

At block 408, the solid state drive controller circuitry 104 reads the data from the block addressable non-volatile memory 108 in the solid state drive 100 at the physical location in the block addressable non-volatile memory 108 stored in the entry in the host L2P indirection table 312 and returns the data to the application 306 that requested the data through the storage stack 308 in the operating system.

Figure 5:
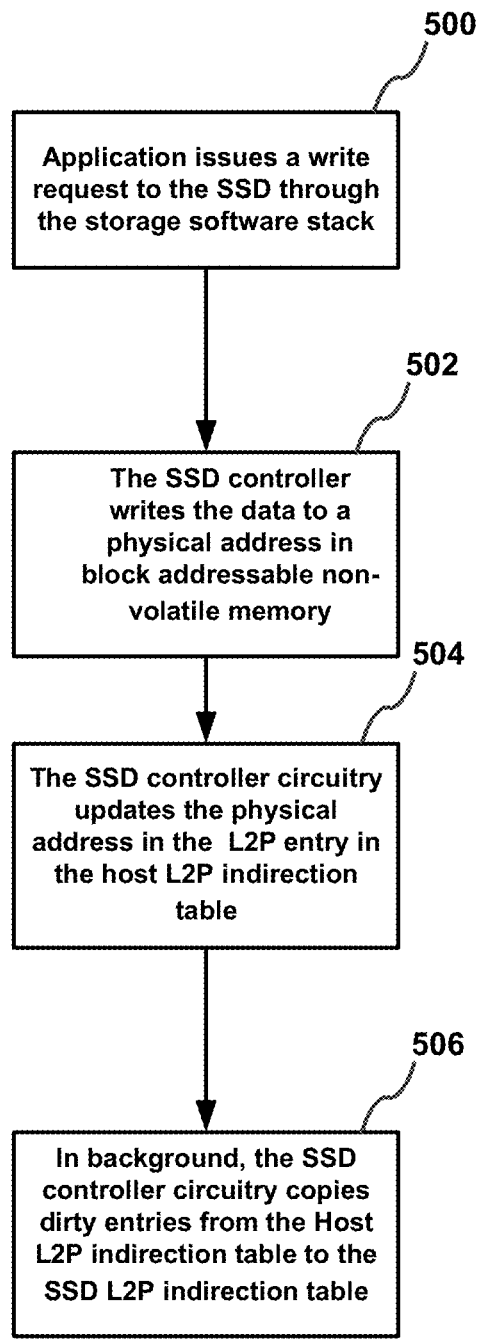
FIG. 5 is a flowgraph of a write operation performed in the solid state drive using the L2P indirection table in the host and the L2P indirection table cache in the solid state drive.

FIG. 5 is a flowgraph of a write operation performed in the solid state drive 100 using the host L2P indirection table 312 in the computer system 300 and the L2P indirection table cache 132 in the solid state drive 100.

Turning to FIG. 5, at block 500, the application 306 issues a write request to a logical block address through the storage stack 308 in the operating system to the solid state drive controller circuitry 104 in the solid state drive 100 to write data to the block addressable non-volatile memory 108 in the solid state drive 100. Processing continues with block 502.

At block 502, the solid state drive controller circuitry 104 writes the data at a physical location (address) in the block addressable non-volatile memory 108 in the solid state drive 100. The physical location (for example, physical location A ("PLOC-A") corresponding to LBA 0 may be NAND Flash die-0, block-1, page-1, offset-0) that may be allocated from a pool of free blocks in the block addressable non-volatile memory 108 allocated to the solid state drive controller circuitry 104). Processing continues with block 504.

At block 504, the solid state drive controller circuitry 104 in the solid state drive 100 creates a new L2P entry in the L2P indirection table cache 132 for the logical block address included in the write request and writes the physical location in the block addressable non-volatile memory 108 corresponding to the logical block address in the new L2P entry. The L2P entry in the L2P indirection table cache 132 is marked "dirty" in the metadata in the L2P entry. Processing continues with block 506.

At block 506, in a background task, the solid state drive controller circuitry 104 copies dirty entries from the Host L2P indirection table 312 to the solid state drive L2P Indirection Table 114 in the solid state drive 100 and marks the L2P entry in the Host L2P indirection table 312 as "clean" after the L2P entry has been written to the solid state drive L2P Indirection Table 114. The background task (referred to as a "lazy flush" task) to update the L2P entries in the solid state drive L2P Indirection Table 114 will be described in conjunction with FIG. 6.

Figure 6:
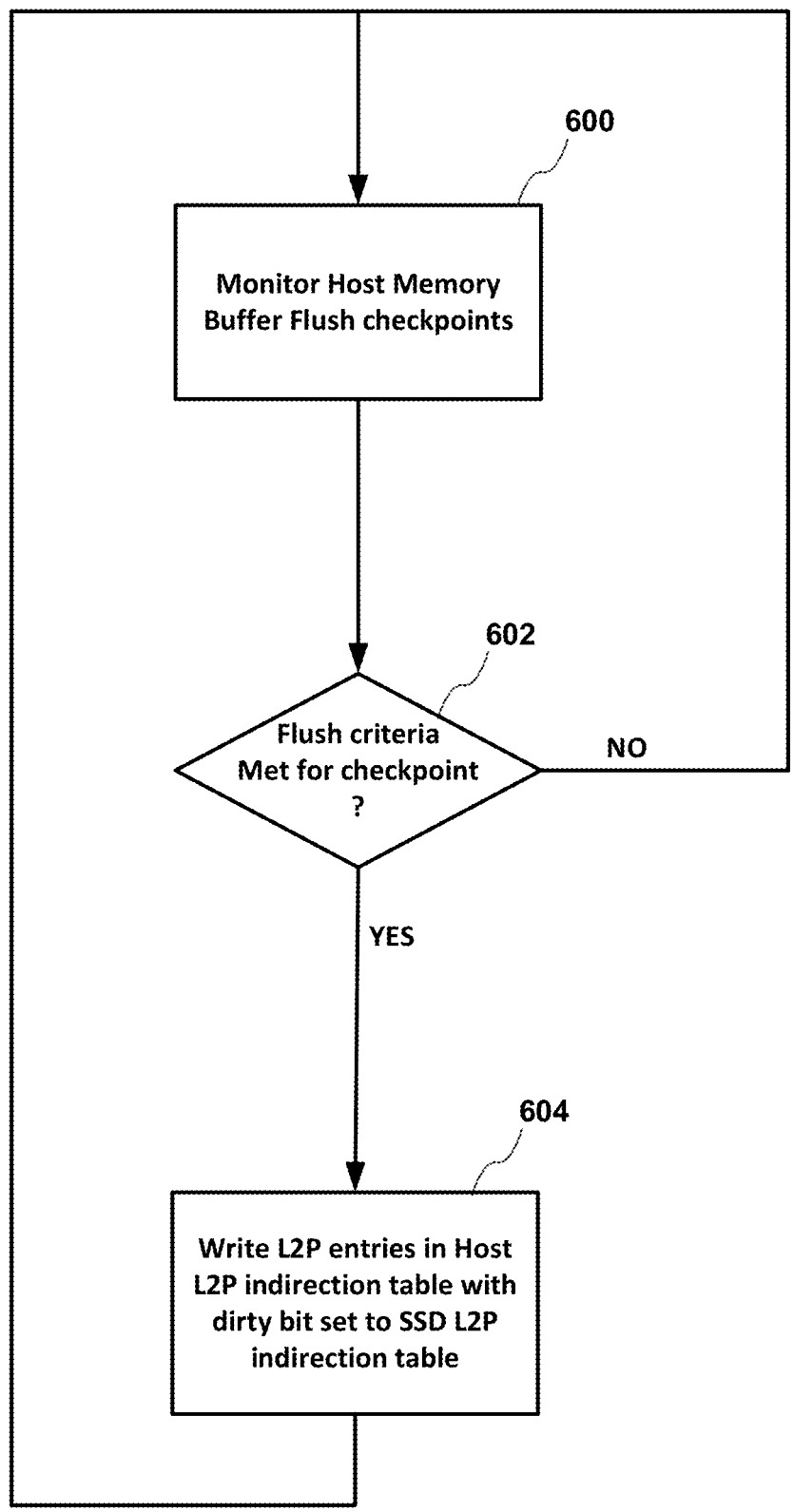
FIG. 6 is a flowgraph illustrating the use of checkpoints to lazily flush "dirty" L2P entries from the Host L2P indirection table to the Solid State Drive L2P Indirection Table.

FIG. 6 is a flowgraph illustrating the use of checkpoints to lazily flush "dirty" L2P entries from the Host L2P indirection table 312 to the solid state drive L2P Indirection Table 114.

At block 600, the solid state drive controller circuitry 104 in the solid state drive 100 monitors host memory buffer flush checkpoints to determine when the dirty entries in the Host L2P indirection table 312 are to be flushed to the solid state drive L2P Indirection Table 114 in the solid state drive 100.

The Host Memory Buffer flush checkpoints include host memory buffer flush, count of free cache entries, active block close, NVMe shutdown notification, entry to non-active power state, power loss notification, device idle. Each of the Host Memory Buffer flush checkpoints are triggered based on criteria for the checkpoint.

The Host Memory Buffer flush checkpoint for Host Memory Buffer index (HBMIdx) is triggered based on the value stored in the HBMIdx. HBMIdx is a pointer to an entry in the Host L2P Indirection table 312 that is stored in the host memory buffer 310. HBM start is a pointer to the first entry in the Host L2P Indirection table 312. The HMBldx flush checkpoint is triggered if HBMIdx wraps around, that is, the HMBldx pointer and the HMB start pointer are the same, that is, equal. A flush of dirty L2P entries in the Host L2P indirection table 312 can be performed to the solid state drive L2P Indirection Table 114 in the solid state drive 100 based on a configurable threshold number of dirty entries in the Host L2P indirection table 312.

The Host Memory Buffer flush checkpoint for free cache group count is triggered dependent on a ratio between the number of unused entries in the Host L2P indirection table 312 and a number of received write commands to be processed. If the number of unused entries is less than or equal to two times the number of received write commands to be processed, dirty L2P entries in the Host L2P indirection table 312 are flushed to the solid state drive L2P Indirection Table 114 in the solid state drive 100. For example, if there are 256 commands to be processed, dirty L2P entries are flushed if there are less than 512 unused entries in the Host L2P indirection table 312.

The Host Memory Buffer flush checkpoint for active block close is triggered to protect against an unexpected power loss in the system. Typically, in the event of an unexpected power loss in the system, there is a period of time from the detection of the unexpected power loss to copy data stored in volatile memory to non-volatile memory. Performing a flush of the dirty entries in the Host L2P indirection table each time an active block is closed ensures that if there is an unexpected power loss in the system, recovery (rebuild) is limited to only the block that is being written at the time of unexpected power loss.

In other embodiments, based on the size of the block and command timeout on the high-speed serial computer expansion bus 120 when a host command is not serviced while the block is copied from the Host L2P indirection table 312, the flush checkpoint can be performed after a portion of the block is written or after more than one block is written.

The Host Memory Buffer flush checkpoint for NVMe shutdown is triggered when the solid state drive controller circuitry 104 receives a NVMe shutdown command over the high-speed serial computer expansion bus 120 from the host circuitry 302. Dirty L2P entries in the Host L2P indirection table 312 are flushed to the solid state drive L2P Indirection Table 114 in the solid state drive 100.

The Host Memory Buffer flush checkpoint for the non-active power state entry checkpoint is triggered due to detection of inactivity in the solid state drive. For example, the solid state drive controller circuitry 104 can receive a request (for example, via an NVMe Set Features command) over the high-speed serial computer expansion bus 120 from the host circuitry 302 to change to the non-active power state. The request can be sent by a device driver in the host due based on detection of inactivity in the system. For example, the non-active power state can be NVMe non-active power state 4 (PS4). PS4 is an extreme low power state when the solid state drive 100 is idle.

In an embodiment, while the solid state drive 100 is in PS4, power is not supplied to the block addressable non-volatile memory and power is only supplied to some portions of the solid state drive controller circuitry. The dirty L2P entries in the Host L2P indirection table 312 can be flushed to the solid state drive L2P Indirection Table 114 in the solid state drive 100 or the flush of the dirty L2P entries in the Host L2P indirection table 312 can be deferred to save power while the solid state drive is in the non-active power state.

The Host Memory Buffer flush checkpoint for Power Loss Notification (PLN) is triggered when the solid state drive controller circuitry 104 receives a PLN. In an embodiment, the PLN is received via a change in state of a signal received over the high-speed serial computer expansion bus 120 from the host circuitry 302. For example, the change in state of the signal may be in response to an imminent power loss via a power switch in the system. In response to the PLN, the dirty L2P entries in the Host L2P indirection table 312 are flushed to the solid state drive L2P Indirection Table 114 in the solid state drive 100.

The Host Memory Buffer flush checkpoint for device idle is triggered upon detecting that the solid state drive 100 is idle. Typically, garbage collection is performed when the solid state drive 100 is idle. Upon detecting that the solid state drive 100 is idle, if the number of dirty entries in the Host L2P indirection table 312 is greater than a threshold number of dirty entries, the dirty L2P entries in the Host L2P indirection table 312 are flushed to the solid state drive L2P Indirection Table 114 in the solid state drive 100 prior to initiating garbage collection.

At block 602, if the criteria has not been met for a flush checkpoint, processing continues with block 600. If the criteria has been met for a flush checkpoint, processing continues with block 604.

At block 604, the L2P entries in the Host L2P direction table with dirty bit set are written to the SSD L2P indirection table. The dirty bit is cleared in response to an acknowledgment from the host that the L2P entries have been written to the SSD L2P indirection table. Processing continues with block 600 to continue to monitor the host memory buffer flush checkpoints.

Figure 7:
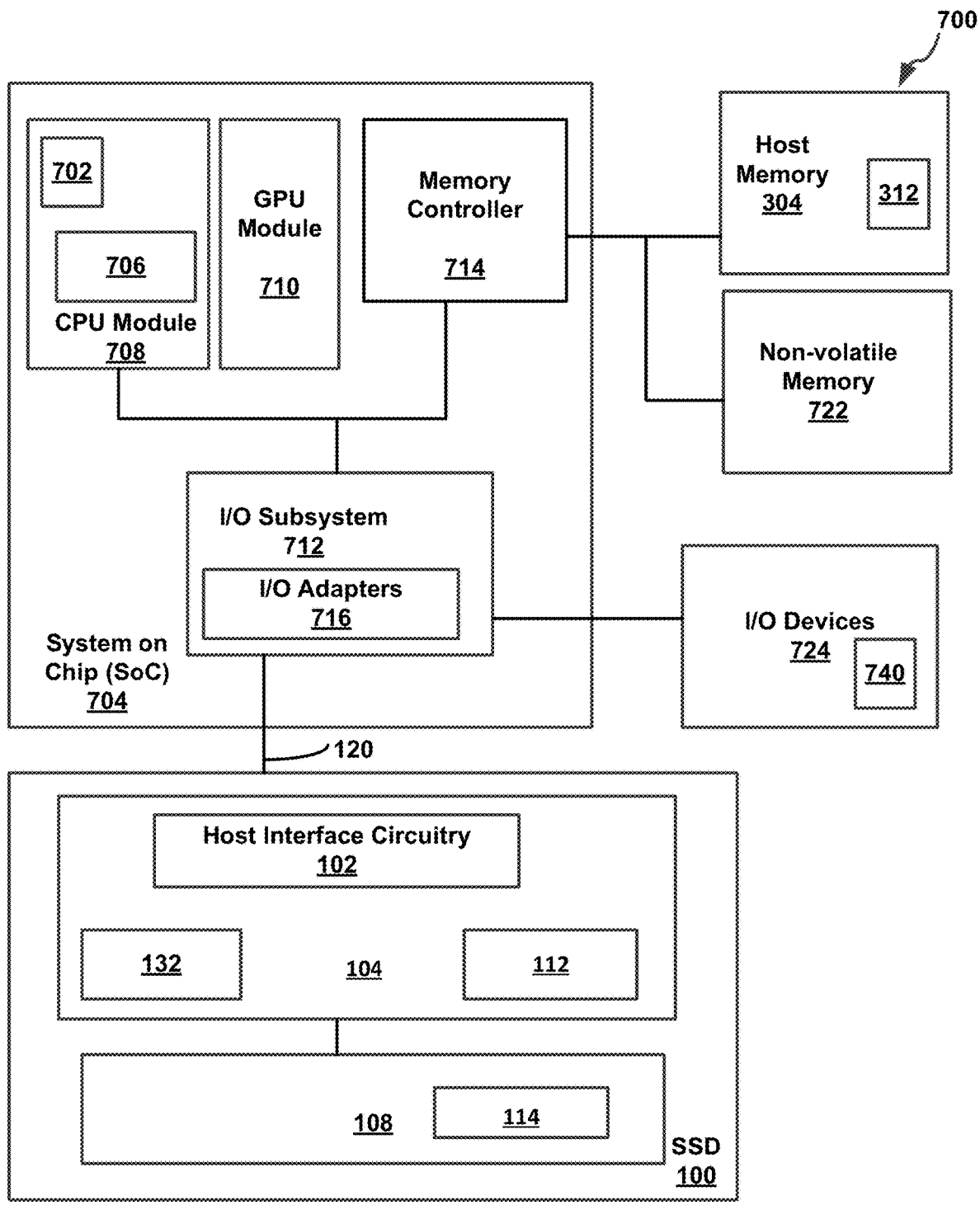
FIG. 7 is a block diagram of an embodiment of a computer system that includes the host L2P indirection table in the host memory to cache an L2P indirection table stored in the block addressable non-volatile memory in the Solid State Drive.

FIG. 7 is a block diagram of an embodiment of a computer system 700 that includes the host L2P indirection table 312 in the host memory 304 to cache an L2P indirection table 114 stored in the block addressable non-volatile memory 108 in the solid state drive 100. Computer system 700 can correspond to a computing device including, but not limited to, a server, a workstation computer, a desktop computer, a laptop computer, and/or a tablet computer.

The computer system 700 includes a system on chip (SOC or SoC) 704 which combines processor, graphics, memory, and Input/Output (I/O) control logic into one SoC package. The SoC 704 includes at least one Central Processing Unit (CPU) module 708, a volatile memory controller 714, and a Graphics Processor Unit (GPU) module 710. In other embodiments, the volatile memory controller 714 and/or the Graphics Processor Unit (GPU) module 710 can be external to the SoC 704. The CPU module 708 includes at least one processor core 702, and a level 2 (L2) cache 706.

Although not shown, each of the processor core(s) 702 can internally include one or more instruction/data caches, execution units, prefetch buffers, instruction queues, branch address calculation units, instruction decoders, floating point units, retirement units, etc. The CPU module 708 can correspond to a single core or a multi-core general purpose processor, such as those provided by Intel® Corporation, according to one embodiment.

The Graphics Processor Unit (GPU) module 710 can include one or more GPU cores and a GPU cache which can store graphics related data for the GPU core. The GPU core can internally include one or more execution units and one or more instruction and data caches. Additionally, the Graphics Processor Unit (GPU) module 710 can contain other graphics logic units that are not shown in FIG. 7, such as one or more vertex processing units, rasterization units, media processing units, and codecs.

Within the I/O subsystem 712, one or more I/O adapter(s) 716 are present to translate a host communication protocol utilized within the processor core(s) 702 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 716 can communicate with external I/O devices 724 which can include, for example, user interface device(s) including a display and/or a touch-screen display 740, printer, keypad, keyboard, communication logic, wired and/or wireless, storage device(s) including hard disk drives ("HDD"), solid state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 716 can also communicate with a solid state drive ("SSD") 100 which includes solid state drive controller circuitry 104 and block addressable non-volatile memory 108 to store the L2P table 114 discussed in conjunction with FIG. 1.

The I/O adapter(s) 716 can include a Peripheral Component Interconnect Express (PCIe) adapter that is communicatively coupled using the NVMe (NVM Express) over PCIe (Peripheral Component Interconnect Express) protocol over bus X44 to a host interface 128 in the SSD X18. Non-Volatile Memory Express (NVMe) standards define a register level interface for host software to communicate with a non-volatile memory subsystem (for example, a Solid State Drive (SSD)) over Peripheral Component Interconnect Express (PCIe), a high-speed serial computer expansion bus). The NVM Express standards are available at www.nvmexpress.org. The PCIe standards are available at www.pcisig.com.

An operating system X42 is software that manages computer hardware and software including memory allocation and access to I/O devices. Examples of operating systems include Microsoft® Windows®, Linux®, iOS® and Android®.

Dirty Logical-to-Physical (L2P) entries in an L2P indirection table stored in a host volatile memory buffer are flushed to non-volatile memory in the solid state drive through the use of a write-back mode based on flush checkpoints. The use of write-back mode to flush dirty entries in the L2P indirection table to non-volatile memory in the solid state drive based on flush checkpoints results in an increase in the write bandwidth of the solid state drive.

The use of write-back mode based on flush checkpoints to flush dirty entries in the L2P indirection table stored in a host volatile memory reduces cost of the solid state drive because the solid state drive does not include a volatile memory (for example, a DRAM) to cache the L2P indirection table stored in non-volatile memory. In addition, the use of flush checkpoints to flush dirty entries results in an increase in write bandwidth to the solid state drive. Furthermore, the use of the host volatile memory instead of volatile memory in the solid state drive to store the L2P indirection table results in seamless and consistent behavior when a span size is within the allocated memory for the Host Memory Buffer. For example, workload in a client environment is a short span workload that typically ranges from 8 GB to 16 GB. The ratio of the L2P table to client workload span is 1:1000. A 64 M Host Memory Buffer can handle 64 GB spans.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A solid state drive comprising:
   a block-addressable non-volatile memory to store a logical-to-physical (L2P) indirection table; and
   controller circuitry communicatively coupled to the block-addressable non-volatile memory and a host memory buffer, the host memory buffer communicatively coupled to the solid state drive, the host memory buffer to store a cache of the L2P indirection table, the controller circuitry to flush a dirty entry from the cache of the L2P indirection table to the L2P indirection table based on a flush checkpoint.

2. The solid state drive of claim 1, wherein the flush checkpoint comprises active block full, the dirty entry is flushed from the cache of the L2P indirection table if an active block is full.

3. The solid state drive of claim 1, wherein the flush checkpoint comprises a host memory buffer index for the host memory buffer, the dirty entry is flushed if the host memory buffer index and a start pointer for the host memory buffer are equal.

4. The solid state drive of claim 1, wherein the flush checkpoint comprises a free cache count, the dirty entry is flushed dependent on a ratio between a number of unused entries in the cache of the L2P indirection table and a number of received write commands to be processed.

5. The solid state drive of claim 1, wherein the flush checkpoint comprises active block full, the dirty entry is flushed if an active block is full.

6. The solid state drive of claim 1, wherein the flush checkpoint comprises NVMe shutdown, the dirty entry is flushed if an NVMe shutdown command is received.

7. The solid state drive of claim 1, wherein the flush checkpoint comprises non-active power state entry checkpoint, the dirty entry is flushed if a request to change to a non-active power state is received.

8. The solid state drive of claim 1, wherein the flush checkpoint comprises power loss notification, the dirty entry is flushed if a power loss notification is detected.

9. The solid state drive of claim 1, wherein the flush checkpoint comprises device idle, the dirty entry is flushed if a device idle is detected.

10. A method comprising:
    storing, in a solid state drive, a logical-to-physical (L2P) indirection table in a block-addressable non-volatile memory;
    storing a cache of the L2P indirection table in a host memory buffer, the host memory buffer communicatively coupled to the solid state drive; and
    flushing, by controller circuitry in the solid state drive, a dirty entry from the cache of the L2P indirection table to the L2P indirection table based on a flush checkpoint.

11. The method of claim 10, wherein the flush checkpoint comprises active block full, the dirty entry is flushed from the cache of the L2P indirection table if an active block is full.

12. The method of claim 10, wherein the flush checkpoint comprises a host memory buffer index for the host memory buffer, the dirty entry is flushed if the host memory buffer index and a start pointer for the host memory buffer are equal.

13. The method of claim 10, wherein the flush checkpoint comprises a free cache count, the dirty entry is flushed dependent on a ratio between a number of unused entries in the cache of the L2P indirection table and a number of received write commands to be processed.

14. The method of claim 10, wherein the flush checkpoint comprises active block full, the dirty entry is flushed if an active block is full.

15. The method of claim 10, wherein the flush checkpoint comprises NVMe shutdown, the dirty entry is flushed if an NVMe shutdown command is received.

16. The method of claim 10, wherein the flush checkpoint comprises non-active power state entry checkpoint, the dirty entry is flushed if a request to change to a non-active power state is received.

17. The method of claim 10, wherein the flush checkpoint comprises power loss notification, the dirty entry is flushed if a power loss notification is detected.

18. The method of claim 10, wherein the flush checkpoint comprises device idle, the dirty entry is flushed if a device idle is detected.

19. A system comprising:
a processor;
a host memory buffer communicatively coupled to the processor;
a solid state drive comprising:
  a block-addressable non-volatile memory to store a logical-to-physical (L2P) indirection table; and
  controller circuitry communicatively coupled to the block-addressable non-volatile memory and the host memory buffer, the host memory buffer communicatively coupled to the solid state drive, the host memory buffer to store a cache of the L2P indirection table, the controller circuitry to flush a dirty entry from the cache of the L2P indirection table to the L2P indirection table based on a flush checkpoint.

20. The system of claim 19, wherein the flush checkpoint comprises active block full, the dirty entry is flushed from the cache of the L2P indirection table if an active block is full.

* * * * *